United States Patent [19]

Kent

[11] 4,396,111

[45] Aug. 2, 1983

[54] OVERLOAD DETECTOR AND INTERRUPT FOR CONVEYOR CHAIN

[75] Inventor: William C. Kent, Garland, Tex.

[73] Assignee: Western Electric Company, Inc., New York, N.Y.

[21] Appl. No.: 222,426

[22] Filed: Jan. 5, 1981

[51] Int. Cl.$^3$ ............................................. B65G 43/00
[52] U.S. Cl. ................................... 198/810; 198/814; 198/856
[58] Field of Search ............. 198/856, 810, 813, 814, 198/815, 323

[56] References Cited

U.S. PATENT DOCUMENTS

| | | | |
|---|---|---|---|
| 1,682,014 | 8/1928 | Margles et al. | 198/323 |
| 2,794,538 | 6/1957 | Schenk | 198/814 |
| 3,200,935 | 8/1965 | Whitefield | 198/814 |
| 3,589,504 | 6/1971 | Blough | 198/814 |
| 3,595,372 | 7/1971 | Mojden . | |
| 3,861,519 | 1/1975 | Ware | 198/814 |
| 3,905,473 | 1/1974 | Jones . | |
| 4,157,753 | 6/1979 | Garnier | 198/856 |

FOREIGN PATENT DOCUMENTS

| | | | |
|---|---|---|---|
| 626579 | 7/1949 | United Kingdom | 198/813 |
| 820982 | 9/1959 | United Kingdom | 198/856 |

*Primary Examiner*—Joseph E. Valenza
*Attorney, Agent, or Firm*—R. P. Miller

[57] ABSTRACT

A conveyor system that may be driven in a forward or a reverse direction is provided with jam detectors that are effective to interrupt the operation of the conveyor chain (10) upon encountering a jam condition in either direction of drive. The chain (10) is driven about idler sprockets (19 and 53) mounted in housings (21 and 51) that are slidably mounted on a T-bar frame (22). When the chain is driven in a forward direction A, a jam condition causes housings (21) to slide and operate a switch (23) to interrupt power to a motor (18). When the direction of drive is reversed, housing (21) is held from movement by a lock (47), and a lock (54) associated with housing (51) is released to allow the housing (51) to shift in response to a jam condition to operate a switch (58) to again interrupt the power applied to the motor (18).

6 Claims, 5 Drawing Figures

OVERLOAD DETECTOR AND INTERRUPT FOR CONVEYOR CHAIN

FIELD OF THE INVENTION

This invention relates to an overload detector and interrupt for conveyor systems and, more particularly, to a conveyor system that may be driven selectively in a forward or a reverse direction together with overload detectors that are effective to interrupt the operation of the conveyor upon detection of a jam condition while the conveyor is driven in either direction.

BACKGROUND OF THE INVENTION

Heretofore single direction moving conveyors have been associated with switches that are operated to interrupt power being supplied to a conveyor drive motor upon detection of an overload or an underload condition. An example of an overload detector is disclosed in U.S. Pat. No. 3,595,372 issued July 27, 1971, to W. M. Mojden. In this patent a conveyor driving chain passes over a sprocket that is rotatably mounted on a movable support. Upon encountering a jam or overload condition in the conveyor, power imparted to the chain is effective to move the idler and its movable support to operate a switch to interrupt power being applied to a motor that drives the conveyor.

An example of a conveyor system having facilities to detect an underload condition is exemplified by U.S. Pat. No. 3,905,473 to R. D. Jones et al. issued Sept. 16, 1975. In this system a conveyor passes over an idler pulley that is mounted on a block which is slidably mounted and normally held in position through the agency of a spring. Upon development of too much slack in the conveyor, the spring acts to move the idler mounting means to actuate a switch which functions to interrupt the power applied to a conveyor drive motor.

SUMMARY OF THE INVENTION

The present invention comtemplates, among other things, a simple to construct and a positively acting conveyor overload detector and drive interrupt that is effective upon encountering a jam condition during the drive of the conveyor in either a forward or a reverse direction.

More particularly, a conveyor chain is driven by an electric motor to pass over a pair of sprockets mounted in a pair of housings slidably mounted on the opposite ends of a bar-like frame. A pair of spring members engage the housings to position portions of the housing beyond the ends of the bar-like frame to provide spaces in which the sprockets are mounted. Selectively operated locks are provided to lock one or the other housing against movement during movement of the conveyor chain in a first direction. When a jam condition is encountered, the unlocked housing and the sprocket are moved relative to the bar to actuate a switch that functions to disrupt the power applied to a conveyor drive motor. When the direction of movement of the conveyor is changed, the locked housing is unlocked while the other housing is locked and again the system will function to interrupt the operation of the drive motor upon encountering a jam condition.

BRIEF DESCRIPTION OF THE DRAWINGS

Other features and advantages of the present invention will be apparent upon consideration of the following detailed description when considered with the accompanying drawings, wherein.

DETAILED DESCRIPTION

Figure 1:
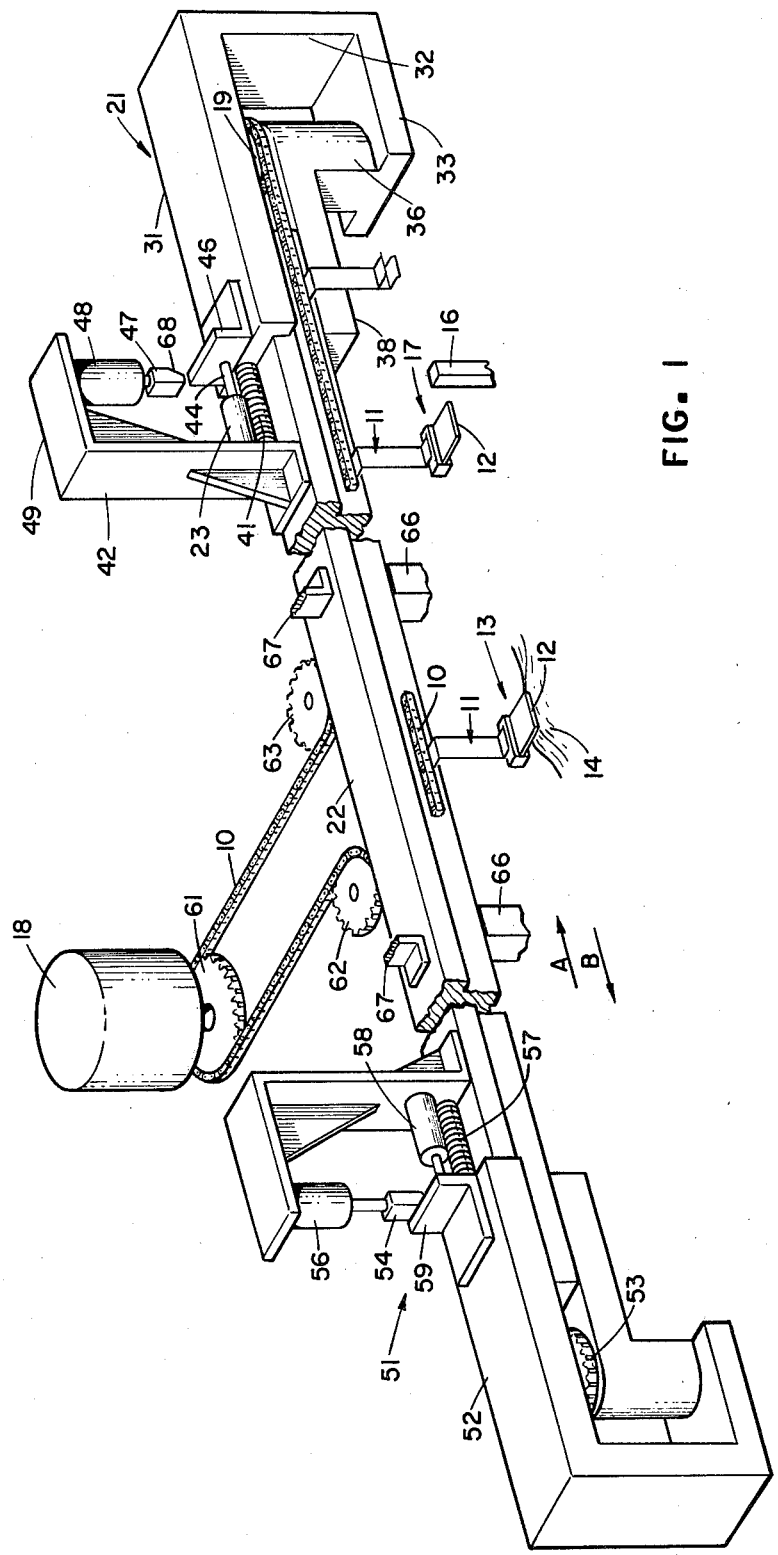
FIG. 1 is a perspective view of a conveyor system operable in a forward and a reverse direction and having overload detect and interrupt features in accordance with the present invention.

Referring to FIG. 1 for an initial consideration of the conveyor system embodying the principles of the invention, there is shown a conveyor chain 10 that may be driven in a forward direction as indicated by the arrow A or in a reverse direction as indicated by the arrow B. The chain mounts a plurality of evenly spaced work holding fixtures 11 which support work pieces 12 that are to be moved through a plurality of work stations. In the illustrated embodiment, the work pieces are small printed circuits that are subsequently assembled to form connectors. Advance of the chain 10 moves the work pieces 12 through a first work station 13 where a solder wave 14 impinges solder onto the underside of the work piece. Subsequent advance of the conveyor moves the work pieces successively into engagement with an ejector pin 16 at a work station 17. The work pieces strike the ejector pin and are removed from the fixture 11 and dropped into a discharge chute or receptacle (not shown). The work stations 13 and 17 are merely illustrative of one application of the invention, and it is to be understood that the invention may be utilized in other systems where parts are to be advanced through a succession of work stations.

If a jam situation arises, such as the work piece 12 not being removed by contact with the ejector pin, the drive force imparted to the chain by an electric motor 18 continues to pull on the chain. The chain passes over a sprocket 19 that is mounted on a housing 12 which, in turn, is slidably mounted on a bar 22 so that the housing moves to the left as viewed in FIG. 1. The movement of the housing operates a switch 23 connected in the energizing circuit for the motor 18. The operation of the switch 23 interrupts the power applied to the motor, hence, stopping the conveyor chain 10 to permit an attending operator to alleviate the jam condition.

Figure 5:
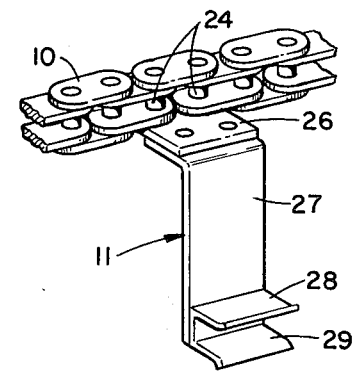
FIG. 5 is an enlarged view of the conveyor chain together with a fixture that holds a part that is to be advanced through one or more fabricating or work stations.

Considering now the structural details, reference is made to FIG. 5 which shows the chain 10 being composed of a number of links. The work holders 11 are attached to a pair of link pins 24 and comprise a small plate 26 secured to a depending arm 27 that provides a support for a spring metal clip having a pair of resilient blades 28 and 29 into which a work piece 12 may be inserted prior to advance of the work holding fixtures into the solder wave work station 13.

Figure 2:
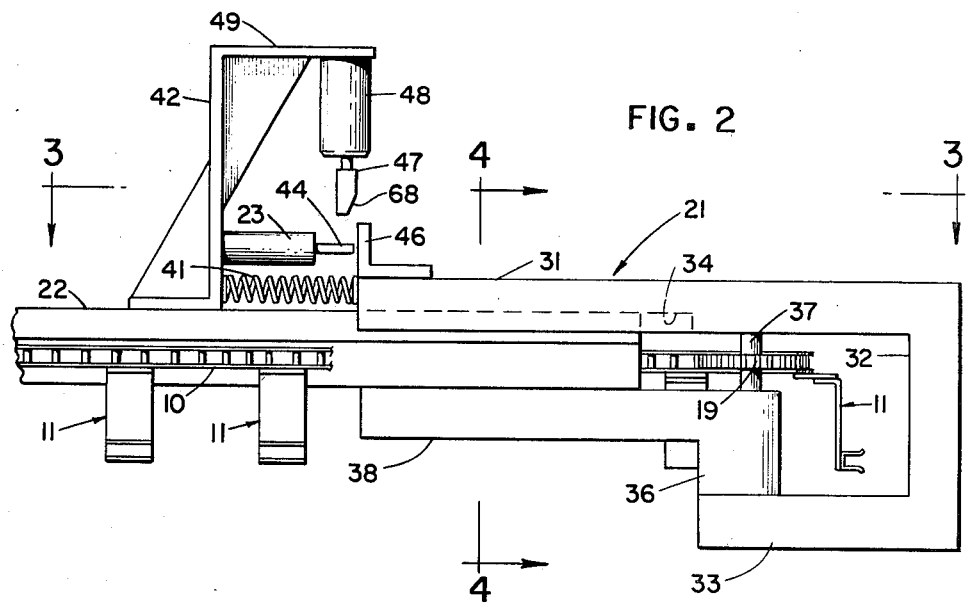
FIG. 2 is a side elevational view of one end of the conveyor shown in FIG. 1 particularly illustrating the mounting for a conveyor idler sprocket in conjunction with the overload detect and interrupt facilities.
Figure 4:
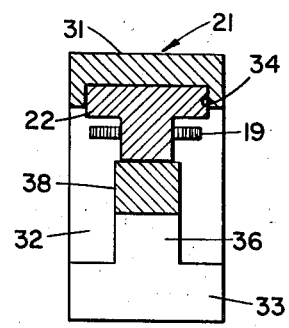
FIG. 4 is a cross-sectional view taken along line 4—4 of FIG. 2 illustrating the structural arrangement of the housing which is movably mounted on a frame for the conveyor.

Looking at FIGS. 1 and 2, it will be noted that the housing 21 is of a U-shaped configuration comprising an upper arm member 31, a spanning member 32 and a lower arm member 33. As shown in FIG. 4 the upper member is cut out to provide a guideway 34 that receives the upper portion of the bar member 22 that is of a T-shaped configuration. The lower member 33 has a boss section 36 into which is mounted an axle 37 having an upper end mounted in the upper member 31. Th sprocket 19 is rotatably mounted within the bight formed by the U-shaped housing and functions as an idler for supporting the chain 10. Extending from the boss 36 is an extension 38 of the lower member 33. This extension, as shown in FIGS. 2 and 4, is in sliding engagement with the underside of the T-shaped bar 22.

Figure 3:
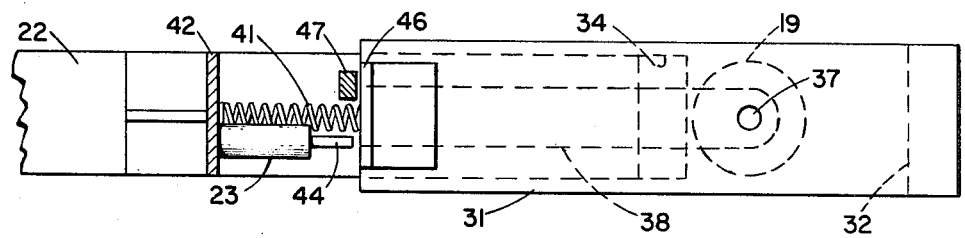
FIG. 3 is a top view taken along line 3—3 of FIG. 2 further illustrating the slidable mounting for the housing supporting the conveyor sprocket.

The slidably mounted housing 21 is engaged by a spring 41 (see also FIG. 3) that is abutted against an upright 42 so that a resilient force is applied to the housing 21 to urge the sprocket 19 toward the right and, thus, hold the chain in a taut condition. Secured to the upright 42 is the switch 23 having a spring-urged plunger actuator 44 positioned to be engaged by an L-shaped stop 46 secured to the forward or leftward end of the housing 21. When the housing 21 is shifted to the left upon the chain or the fixtures encountering a jam condition, the drive force imparted to the chain causes the housing 21 to move to the left to advance the stop into engagement with the switch actuator 44. Movement of the actuator 44 opens the switch 23 to drop out a latched relay to interrupt the power applied to the electric motor 18.

The movement of the housing 12 may be selectively prevented by moving a lock element 47 downwardly into engagement with the forward face of the L-shaped stop 46. Lock element 47 is mounted on a piston extending into an air cylinder 48 mounted on a beam 49 extending from the upright 42. When the air cylinder 48 is operated, the lock 47 moves to engage the stop member 46 to thus prevent movement of the housing 21 upon occurrence of a jam condition. This lock mechanism will be operated when the conveyor chain 10 is driven in the reverse direction as indicated by the arrow B.

When the chain is operated in the reverse direction, a jam detector positioned on the left-hand portion of the frame bar 22 is operated to disrupt the power supplied to the motor 18. This jam detector is generally designated by the reference numeral 51 and includes parts which are identical to the parts described with respect to the jam detector positioned at the right end of the bar 22. More particularly, there is provided a housing 52 that is slidably mounted on the T-bar 22. An idler sprocket 53 is mounted in the housing 52. In this instance a lock member 54 is selectively positioned by operation of an air cylinder 56. A spring 57 is again provided to urge the housing 52 toward a leftward position to tension the conveyor chain 10. A second switch 58 is positioned to be operated by a stop member 59 upon the chain encountering a jam condition. The switch 58 is included in the power circuit for the motor 18.

As shown in FIG. 1, the chain 10 is driven by a drive sprocket 61 to pass around an idler sprocket 62, the slidably mounted idler sprocket 53, the slidably mounted sprocket 19 and an idler sprocket 63. The T-bar 22 is part of the frame of the overall machine and may be connected to the machine frame by supports 66 and brackets 67. In order to facilitate the movement of the lock members 47 and 54 into engagement with the stops 46 and 59, the forward faces of the lock members may be slightly beveled as indicated by reference numeral 68 associated with lock member 47.

In summary, assume that it is desired to operate the conveyor system to drive the chain 10 in a direction indicated by the arrow A. First, the air cylinder 56 is operated to move the lock member 54 downwardly to engage the stop member 59 to hold the housing 52 from movement toward the right. The lock member 47 is positioned by the air cylinder 48 in the upper position free of engagement by the stop member 46. If a jam is encountered by the chain as it moves from sprocket 53 to sprocket 19, the chain will be continued to be drawn by the drive sprocket 61. The force imparted to the chain reacts against the sprocket 19 and the housing 21 to move the housing toward the left to advance the stop member 46 to operate the switch 23 and, thus, interrupt the power supply to the motor 18. When it is desired to drive the conveyor chain toward the left as indicated by the arrow B, the lock member 47 is moved down into position to engage the stop member 46. The air cylinder 56 is operated to withdraw the lock member 54 from engagement with the stop member 59. In this instance, the motor is driven in a reverse direction and the chain will move from right to left through a variety of work stations, not shown.

In the afore-description, the interrupt facilities have been described with respect to a conveyor that may be selectively driven in a forward or reverse direction. In those situations where the conveyor is driven in a single direction, the overload or jam detector facilities associated with one end of the bar or the other, depending upon the direction of drive, may be eliminated. Assume that it is desired to provide a conveyor system that will only move in direction A, then the slidable mounting sprocket 53 may be dispensed with and the drive applied directly to this sprocket.

What is claimed is:

1. A conveyor system, which comprises:
  a frame bar;
  a first generally U-shaped housing having a first arm provided with a guideway for receiving a top portion of a first end section of said frame bar and slidably mounting said first housing on the top of a first end section of said frame bar, and a second arm member in sliding engagement with the bottom of said first end section;
  first resilient means engaging and pressing against said first housing to position the bight of said U-shaped housing beyond said first end of said frame bar;
  a first idler means mounted rotatably in the bight of the first U-shaped housing;
  a second generally U-shaped housing having a first arm provided with a guideway for receiving a top portion of a second opposite end section of said frame bar slidably mounting said second housing on the top of a second end section of said frame bar, and a second arm member in sliding engagement with the bottom of said first end section;
  second resilient means engaging and pressing against said housing to position the bight of said U-shaped housing beyond said second end of said frame bar;
  a second idler means mounted rotatably in the bight to the second U-shaped housing;
  a conveyor means passing around a substantial portion of both of said idler means and running along one side of the frame bar;

means for selectively driving the conveyor means in an opposite first and second directions relative to said one side of the frame bar;

a first switch operated by said first housing moving relative to said frame bar in response to a jamming of said conveyor means running along said one side of the frame bar for interrupting operation of said driving means when said conveyor is driven in the first direction; and a second switch operated by said second housing moving relative to said frame bar in response to a jamming of said conveyor means for interrupting operation of said driving means when said conveyor means is driven in the second direction.

2. A conveyor system as defined in claim 1, which comprises:

a first lock means for engaging said first housing to prevent movement thereof in response to a jam condition being encountered by said conveyor means moving in a first direction;

a second lock means for engaging said second housing to prevent movement thereof in response to a jam condition being encountered by said conveyor means moving in a reverse direction; and means for selectively moving said first or second lock means into position to block movement of said first or second housing.

3. A conveyor overload and interrupt system, which comprises:

a support bar;

a first housing mounted for sliding movement along a first end section of said bar;

a first sprocket mounted in said first housing;

first means for biasing said first housing toward said first end of said bar so that a portion of said first housing with said first sprocket extends beyond said support bar;

a second housing mounted for sliding movement along a second end section of said bar;

a second sprocket mounted in said second housing;

second means for biasing said second housing toward said second end of said bar so that a portion of said second housing with said second sprocket extends beyond said support bar;

a conveyor passing around substantial portions of said first and second sprockets;

means for driving said conveyor in either a first direction whereupon interference with the movement of the conveyor moves the first sprocket against the effects of the first biasing means, or in a second direction whereupon interference with the movement of the conveyor moves the second sprocket and the housing against the effect of said biasing means;

a first lock member mounted for movement into blocking position to block movement of said second housing against said first biasing means;

means for moving said first lock member into blocking position when said conveyor is driven in the first direction;

a second lock member mounted for movement into blocking position to block movement of said first housing against said second biasing means;

means for moving said second lock members into blocking position when said conveyor is driven in the second direction;

and means responsive to a predetermined movement of either housing against its associated biasing means for interrupting operation of said driving means.

4. A conveyor overload and interrupt system as defined in claim 3, wherein the bar is T-shaped and each of the housings have ways formed therein to receive the cross bar section of the T-shaped bar.

5. A conveyor overload and interrupt system as defined in claim 4, wherein said housings are substantially U-shaped and the end sections of the bar are positioned within the bights of the U-shaped housings with one arm of each U-shaped housing having a way formed therein to receive the cross section of the T-shaped bar.

6. A conveyor overload and interrupt system as defined in claim 3, which includes:

a first switch operated by a predetermined movement of said first housing for operating said conveyor interrupting means; and a second switch operated by a predetermined movement of the second housing for operating said conveyor interrupting means.

\* \* \* \* \*